Dec. 8, 1959     S. D. ROSS     2,916,680
DIELECTRIC COMPOSITIONS
Filed Dec. 7, 1955
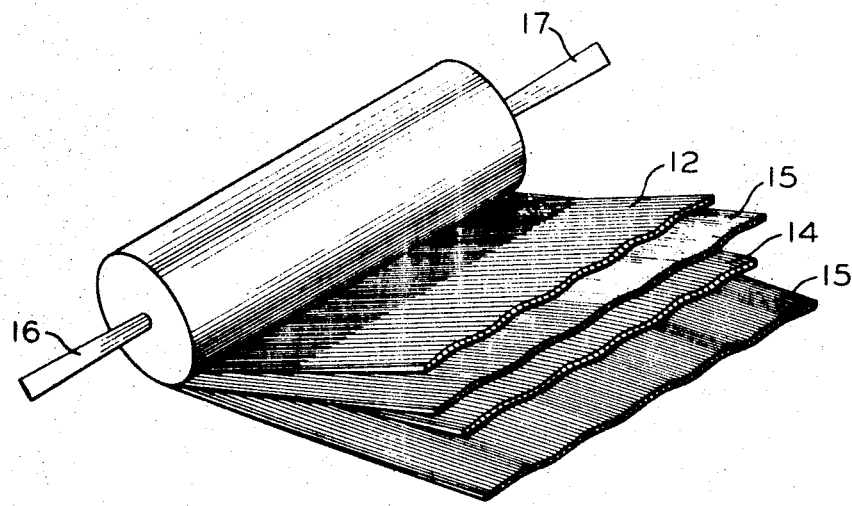
INVENTOR.
SIDNEY D. ROSS
BY *Roland A Dexter*
HIS ATTORNEY

2,916,680
DIELECTRIC COMPOSITIONS

Sidney D. Ross, Williamstown, Mass., assignor to Sprague Electric Company, North Adams, Mass., a corporation of Massachusetts Application December 7, 1955, Serial No. 551,710

3 Claims. (Cl. 317—258)

This invention relates to improved dielectric compositions and more particularly refers to dielectric impregnants for electrical capacitors. It is filed as a continuation-in-part of United States patent application, Serial No. 328,811, filed December 30, 1952.

The use of stabilizers in dielectric compositions for capacitors, transformers, circuit breakers and other devices, is well known. One difficulty which appears common to most prior art stabilizers and inhibitors is the relatively large concentrations required to effect stabilizing influence over a long period of time, particularly at elevated temperatures. Simple observation indicates that the inhibitor is consumed and once it is effectively removed from its function, the dielectric composition rapidly deteriorates. Use of large quantities of inhibitors to achieve the extended protection is undesirable for very few, if any, of the materials used for the purpose, possess electrical properties in any way comparable to those of the dielectric composition to be stabilized. Further, in the case of solid dielectrics, the melting point of the modified dielectric may be depressed to a temperature below the rated maximum temperature of the capacitor. For example, insulation resistance is generally lowered appreciably by the presence of inhibitors while the power factor becomes higher. These changes cannot be tolerated to any large extent in many applications, but particularly in capacitors whose internal heating to a large extent determines the operating limits.

It is an object of the present invention to overcome the foregoing and related disadvantages. A further object is to produce a capacitor particularly suited for operation at high ambient temperatures and impregnated with a stabilized dielectric. A still further object is to produce electrical capacitors of extended life without deleteriously affecting their electrical properties. Additional objects will become apparent from a consideration of the following description and claims.

These objects are attained in accordance with the present invention by a capacitor impregnated with a dielectric composition comprising a predominant amount of a dielectric selected from the class consisting of hydrocarbons and halogenated hydrocarbons and from about 0.1 to about 5.0% of a polyazoaromatic compound having a molecular weight in excess of 300.

In another sense, the invention is concerned with a dielectric composition comprising a halogenated aromatic hydrocarbon in which is dissolved from about 0.1% to about 5.0% of a polyquinone compound.

According to the present invention I have discovered that the utility of the stabilizer for any dielectric composition can be greatly increased, for any given weight concentration, by use of a polyfunctional inhibitor. Further, my dielectric compositions, in those cases where the dielectric is a solid material, have negligible depression of their melting point upon addition of the inhibitor. As a general rule, each molecule of inhibitor possesses at least two functional groups and preferably three or more. The effectiveness of such molecules is confirmed by experimental evidence which shows that they will cause a highly effective stabilizing action without a deleterious effect on the primary dielectric properties. Of great importance is the fact that the extended operational conductivity of the dielectric is much lower than the same dielectric stabilized with the known inhibitors. This is believed to be due to the low mobility of the inhibitor products which are formed in the inhibition process. The molecular weights of such products are, according to my invention, ordinarily in excess of 300.

One preferred series of compounds employed with dielectric compositions as capacitor impregnants in accordance with my invention are the polyazoaromatic series of which the simply and most readily prepared types are the polyazobenzenes, specifically those listed below:

Dis-azobenzene
Tris-azobenzene
Tetrakis-azobenzene as well as various equivalent nuclear substituted derivatives thereof, which are not specifically claimed. The substituted groups must not be either acidic or basic in character to obtain the desired electrical characteristics.

The polyazo aromatic compounds are not broadly new, and their preparation is disclosed by Ruggli and Petitjean in Helv. Chim. Acta 21, 711–32 (1938). Since each of these compositions is characterized by relatively strong colors, even in the pure crystalline state, their presence and concentration in a dielectric composition can be readily ascertained.

The dielectric compositions to which the present invention is directed consists of hydrocarbons such as mineral oils, polymers of olefins such as polyisobutylene polymers and copolymers, di-olefins, vinyl aromatic compounds and the like, and the halogenated dielectrics, particularly the chlorinated aromatic compounds as represented by chlorinated biphenyl, chlorinated naphthalene and chlorinated phenyl indans.

Another preferred series of poly inhibitor compounds are the polyquinones of which several representative compounds are:

Quinone—formaldehyde polymer, e.g. the polyquinone obtained by self-condensation and subsequent oxidation of tetramethylol-hydroquinone, and polyvinyl-quinone, obtained by polymerization and oxidation of vinyl hydroquinone. (See the article by Cassidy et al., J. Am. Chem. Soc. 71, 402–410 (1949) and also Carswell's publication "Phenoplasts," pages 52–53 (1947) published by Interscience Publishers.) Of the polyquinones, polyvinyl-quinone is preferred because of its effectiveness as a stabilizer. This reddish-orange solid is easily soluble and appears to yield stabilizer products of exceptional low mobility or stabilizer products which are somehow removed from the active dielectric, as the lifetime at high dielectric stress and temperature is remarkable. Although taught along with the polyazoaromatics as stabilizers, the polyquinones for reasons not fully understood produce relatively better stabilization. As pointed out above, the ready solubility, high molecular weight and excellent dielectric-wise decomposition products may explain the result.

The concentrations of stabilizers ordinarily follow from about 0.1 to 5.0%.

While the preferred series of compounds have been disclosed above, it is also possible to employ other polyfunctional compounds containing inhibiting groups.

One series of compounds are the polynitroso aromatics. Representative compounds which fall within this group are:

Nitroso benzene-formaldehyde polymer
p-Hydroxy nitroso benzene-formaldehyde polymer
p-Methoxy nitroso benzene-formaldehyde polymer These are generally prepared by condensing the nitroso phenol with formaldehyde.

A further series of compounds are polyhydroquinones and representative compounds are:

Hydroquinone-formaldehyde polymer
Polyvinyl hydroquinone

These are generally prepared in conformance with the teachings of the above references relating to polyquinones.

An additional series of compounds falling within the scope of this disclosure are the polybenzil and representative compounds are:

p-Dis-benzil
p-Tris-benzil
p-Tetrakis-benzil

These are prepared generally by the condensation of 1,4-dialdehydobenzene into the polybenzoin compounds which are then oxidized into the polybenzils.

Another series of compounds are the polyazoxy aromatic type of which representative compounds are:

Dis-azoxy benzene
Tris-azoxy benzene
Tetrakis-azoxy benzene

These are generally prepared by the reaction of peracetic acid with the known polyazoaromatic type of compounds. A further type is the complex of a quinone with an amine or an aromatic hydrocarbon, e.g., anthraquinone-anthracene complex, anthraquinone-dimethyl aniline complex.

Reference should now be made to the appended drawing which shows a partly unwound capacitor in which the stabilized dielectric of the invention is used as the impregnant. This convolutely wound capacitor section consists of two electrode foils 12 and 14 separated by a dielectric spacer material 15. Such a capacitor section preferably consists of aluminum foil separated by a thin calendered kraft paper dielectric spacer material. Flat, flexible metallic electrically conducting tabs 16 and 17 are wound into the capacitor section so as to electrically contact the respective capacitor electrodes and so as to extend from the opposite ends of the section 10. The section which is impregnated after incorporation into a metallic housing of any of the well-known types has its electrodes connected to the respective terminals of the housing by means of the tabs 16 and 17. The novel dielectric composition is introduced into the capacitor section by vacuum impregnation methods which are well-known to the art.

The capacitor of the construction illustrated in the pending drawing was impregnated with a stabilized dielectric composition. The capacitor section consisted of two super-imposed aluminum foils, 0.25 mil thick and 1.5" wide, separated by two layers of 0.4 mil thick and 1.75" wide calendered kraft paper having a density of from 0.97 to about 1.0. The capacitor unit was rated at 1.0 microfarad and 600 volts D.C. The impregnant consisted of 1.5% by weight of tris-azobenzene admixed with mineral oil and was impregnated into the capacitor structure by vacuum means at 85° C. These capacitors exhibited much improved life over units impregnated with the non-stabilized dielectric when both were subjected to an extended life test at 125° C. operating temperature.

Further examples indicative of the practice of this invention include dielectric systems impregnated into the above capacitor construction in which the respective dielectrics were as follows:

(1) Chlorinated naphthalene wax admixed with 3% by weight of dis-azobenzene.

(2) Mineral oil having a flash point of 570° F. admixed with 3% by weight of polyvinylquinone.

(3) Liquid isobutylene having an average molecular weight of about 3000 admixed with 4% by weight of polyvinylhydroquinone.

(4) Chlorinated diphenyl admixed with 0.5% of a quinone formaldehyde polymer.

(5) Mineral oil having a viscosity of 500 c.p.s. at 25° C. admixed with 3% by weight of oxidized hydroquinone formaldehyde polymer.

These compositions set forth hereabove are representative of those coming from the scope of my invention and are understood not to be limiting in nature, but merely illustrative to the true scope and breadth of my contribution to the art.

The stabilizers of the invention, when used with the saturated and unsaturated hydrocarbon dielectrics, commonly known in the art, have been found to remarkably extend the operating lifetime of capacitors impregnated with the systems over similar capacitors impregnated with a common primary dielectric which does not contain a stabilizer of the invention. The use of my stabilizers overcomes the disadvantages of the prior art stabilizers which often times reduce the resistivity of the dielectric upon their addition to a low value such that they are no longer suitable for present day applications in electronic circuits. Further these stabilizers of the invention are soluble to a high level in the dielectrics set forth above, which lack of solubility has previously prevented what were thought otherwise to be effective stabilizers from being used. Further, the stabilizers are of such molecular size as to have relatively low mobility so that they can accept conducting particles which would otherwise lead to substantial degradation of the component and upon acceptance retain such low mobility as to inhibit or prevent further electrical degradation.

The dielectric compositions of the invention may also be used for transformers, circuit breakers and numerous other devices in which the insulating material is in an electric field.

As many apparently widely different embodiments of this invention may be made without departing from the spirit and scope thereof, it is to be understood that the invention is not limited to the specific embodiments hereof except as defined in the appended claims.

I claim:

1. An electrical capacitor comprising at least two electrodes, separated by a porous paper dielectric spacer, said dielectric spacer being substantially fully impregnated with a principal dielectric selected from the class of hydrocarbons and ring-chlorinated aromatic hydrocarbons, admixed with from about 0.1% to about 5% of a polymeric form of inhibitor compound selected from the class consisting of the polymeric compounds containing the azo group and polymeric compounds having quinone grouping, said inhibitor compounds having no acidic or basic substituted group and having the property of maintaining the resistivity of the impregnant.

2. An electrical capacitor comprising a plurality of electrodes separated by a porous paper dielectric spacer, said dielectric spacer being substantially fully impregnated with a principal dielectric selected from the class of hydrocarbons and ring-chlorinated aromatic hydrocarbons, admixed with from about 0.1% to about 5% of a polyazoaromatic compound selected from the group consisting of dis-azobenzene, tris-azobenzene and tetrakis-azobenzene.

3. An electrical capacitor comprising a plurality of electrodes separated by a porous paper dielectric spacer, said dielectric spacer being substantially fully impregnated with a principal dielectric selected from the class of hydrocarbons and ring-chlorinated aromatic hydrocarbons, admixed with from about 0.1% to about 5% of a polyquinone compound selected from the group consisting of polyvinyl quinone and the quinone-formaldehyde polymer.

References Cited in the file of this patent

UNITED STATES PATENTS

| | | |
|---|---|---|
| 1,819,585 | Zuckermandel | Aug. 18, 1931 |
| 2,594,873 | Clark | Apr. 29, 1952 |

OTHER REFERENCES

"Stabilization of Chlorinated Diphenyl in Paper Capacitors," by L. J. Berberich et al., Industrial and Engineering Chemistry, vol. 40, No. 1, January 1948, pp. 117–123.